United States Patent [19]
Bartholomew

[11] Patent Number: 5,655,796
[45] Date of Patent: Aug. 12, 1997

[54] TUBULAR ASSEMBLY AND METHOD OF MAKING SAME

[75] Inventor: Donald Dekle Bartholomew, Mt. Clemens, Mich.

[73] Assignee: Proprietary Technology, Inc., Bloomfield Hills, Mich.

[21] Appl. No.: 406,956

[22] PCT Filed: Jul. 9, 1993

[86] PCT No.: PCT/US93/06477

§ 371 Date: May 23, 1995

§ 102(e) Date: May 23, 1995

[87] PCT Pub. No.: WO94/07076

PCT Pub. Date: Mar. 31, 1994

Related U.S. Application Data

[63] Continuation-in-part of PCT/US92/08007, Sep.21 1992.

[51] Int. Cl.$^6$ .................................................. F16L 37/12
[52] U.S. Cl. .................. 285/305; 29/507; 29/523; 285/214
[58] Field of Search ................................ 285/305, 321, 285/318, 250, 405, 222, 214, 319, 258, 382.4; 29/507, 523

[56] References Cited

U.S. PATENT DOCUMENTS

| | | | |
|---|---|---|---|
| 65,603 | 6/1867 | Quinn | 285/214 |
| 2,167,258 | 7/1939 | Wilson . | |
| 2,228,018 | 1/1941 | Scholtes | 29/507 |
| 2,338,666 | 1/1944 | Nelson | 29/507 |
| 2,695,446 | 11/1954 | Meyer | 285/405 |
| 3,091,483 | 5/1963 | Hruby, Jr. . | |
| 3,401,447 | 9/1968 | Knight | 29/507 |
| 3,534,988 | 10/1970 | Lindsey | 29/523 |
| 3,603,621 | 9/1971 | Parsons . | |
| 3,610,664 | 10/1971 | Hansson . | |
| 3,666,297 | 5/1972 | Marks . | |
| 3,756,632 | 9/1973 | Riggs et al. | 285/250 |
| 3,923,323 | 12/1975 | Brogan . | |
| 4,068,863 | 1/1978 | Lasko . | |
| 4,191,408 | 3/1980 | Acker . | |
| 4,243,254 | 1/1981 | Hill et al. . | |
| 4,256,335 | 3/1981 | Nielsen, Jr. . | |
| 4,349,070 | 9/1982 | Zinn et al. | 285/214 |
| 4,526,411 | 7/1985 | Bartholomew . | |
| 4,593,943 | 6/1986 | Hama et al. . | |
| 4,637,640 | 1/1987 | Fournier et al. . | |
| 4,643,466 | 2/1987 | Conner et al. . | |
| 4,712,813 | 12/1987 | Passerell et al. . | |
| 4,721,331 | 1/1988 | Lamelchtrich . | |
| 4,770,447 | 9/1988 | Umehara | 285/405 |
| 4,810,009 | 3/1989 | Legris . | |
| 4,811,975 | 3/1989 | Paul, Jr. et al. . | |
| 4,828,297 | 5/1989 | Tarum . | |
| 4,832,378 | 5/1989 | Zepp . | |
| 4,842,309 | 6/1989 | La Vene et al. . | |

(List continued on next page.)

FOREIGN PATENT DOCUMENTS

| | | | |
|---|---|---|---|
| 149232 | 5/1949 | Australia | 29/507 |
| 193271 | 9/1986 | European Pat. Off. . | |
| 801859 | 9/1958 | United Kingdom . | |
| WO92/08920 | 5/1992 | WIPO . | |

*Primary Examiner*—Eric K. Nicholson
*Attorney, Agent, or Firm*—Harness, Dickey & Pierce

[57] ABSTRACT

The present invention tubular assembly comprises a tubular member (14), an annular bushing (17) therearound and a ferrule (21) therewithin. The bushing (17) is fit around a predetermined portion of the tubular member (15) and the ferrule (21) is then inserted within a distal end (35) thereof. The ferrule (21) acts to expand portions of the inside and outside surfaces (33 and 31) of the tubular member (15) which are longitudinally adjacent to the bushing (17). A ferrule (75) may further have an outwardly projecting flange (79) at its trailing end which serves to retain a seal (83) thereupon. Also, in another embodiment, a lip (103) located around the diameter of the ferrule's flange (101) and projecting normal thereto serves to center the distal end of the tubular member (91) within a connected female housing (23).

21 Claims, 5 Drawing Sheets

U.S. PATENT DOCUMENTS

| | | |
|---|---|---|
| 4,844,515 | 7/1989 | Field . |
| 4,867,484 | 9/1989 | Guest . |
| 4,948,175 | 8/1990 | Bartholomew . |
| 5,105,787 | 4/1992 | Imoehl . |
| 5,207,462 | 5/1993 | Bartholomen ............................ 285/321 |
| 5,275,448 | 1/1994 | McNaughton et al. ................. 285/305 |
| 5,342,095 | 8/1994 | Klinger et al. .......................... 285/321 |
| 5,350,203 | 9/1994 | McNaughton .......................... 285/305 |
| 5,374,089 | 12/1994 | Davie et al. ............................. 285/318 |
| 5,492,374 | 2/1996 | Saver et al. ............................. 285/305 | ns
TUBULAR ASSEMBLY AND METHOD OF MAKING SAME

This application is a continuation-in-part of co-pending application Ser. No. PCT/US92/08007 filed Sep. 21, 1992.

BACKGROUND OF THE INVENTION

This invention relates generally to a connector assembly through which a fluid flows and specifically to an expandable tubular member having a bushing installed thereupon and a ferrule inserted therewithin.

In the automotive industry, as well as for many other industries, the need always exists for low cost, reliable and easy to assemble components. This need is especially apparent with respect to providing a connection between fluid conveying conduits, such as fuel, brake or refrigerant lines. Traditionally, such a connection is comprised of a male tubular member being retained within a female housing or connection retained by a threaded fitting or nut. However, more recently, snap together quick connect attachments have been used in place of threaded fittings.

In order to retain the quick connect fastener or threaded fitting, some tubular members require a bead to be circumferentially located therearound. This outwardly projecting bead may be either integrally formed or mechanically attached onto the outside of the tubular member. Furthermore, it is important that this bead be firmly attached to a predetermined longitudinal position on the tubular member in order to maintain a secure and leak-resistant fit within the mating female housing or connector half. If such a connection becomes dislodged or leaks, the vehicle could become disabled or could even pose a safety hazard to its occupants.

SUMMARY OF THE INVENTION

In accordance with the present invention, the preferred embodiment of a tubular assembly comprises an expandable tubular member, an annular bushing therearound and a ferrule therewithin. The bushing is fit around a predetermined portion of the tubular member and the ferrule is then inserted within a distal end thereof. The ferrule acts to expand portions of the inside and outside surfaces of the tubular member which are longitudinally adjacent to the bushing. Therefore, the bushing is firmly held to the tubular member.

The ferrule may further have an outwardly projecting flange at its trailing end which serves to retain a seal thereupon. Also, in another embodiment, a lip located around the circumference of the ferrule's flange and projecting normal thereto serves to center the distal end of the tubular member within a female housing.

Accordingly, the present invention has many advantages over the prior art. The ferrule acts to securely fasten and locate the bushing at a predetermined position on the tubular member. This provides a stronger attachment than that conventionally used. Furthermore, the same ferrule acts to retain the seal onto the tubular member. Moreover, the ferrule acts to center the tubular member within its mating connector. Thus, a single ferrule of the present invention serves multiple functions while being easily installed within the tubular member.

Additional advantages and features of the present invention will become apparent from the following description and appended claims, taken in conjunction with the accompanying drawings.

DETAILED DESCRIPTION OF THE PREFERRED EMBODIMENTS

Figure 1:
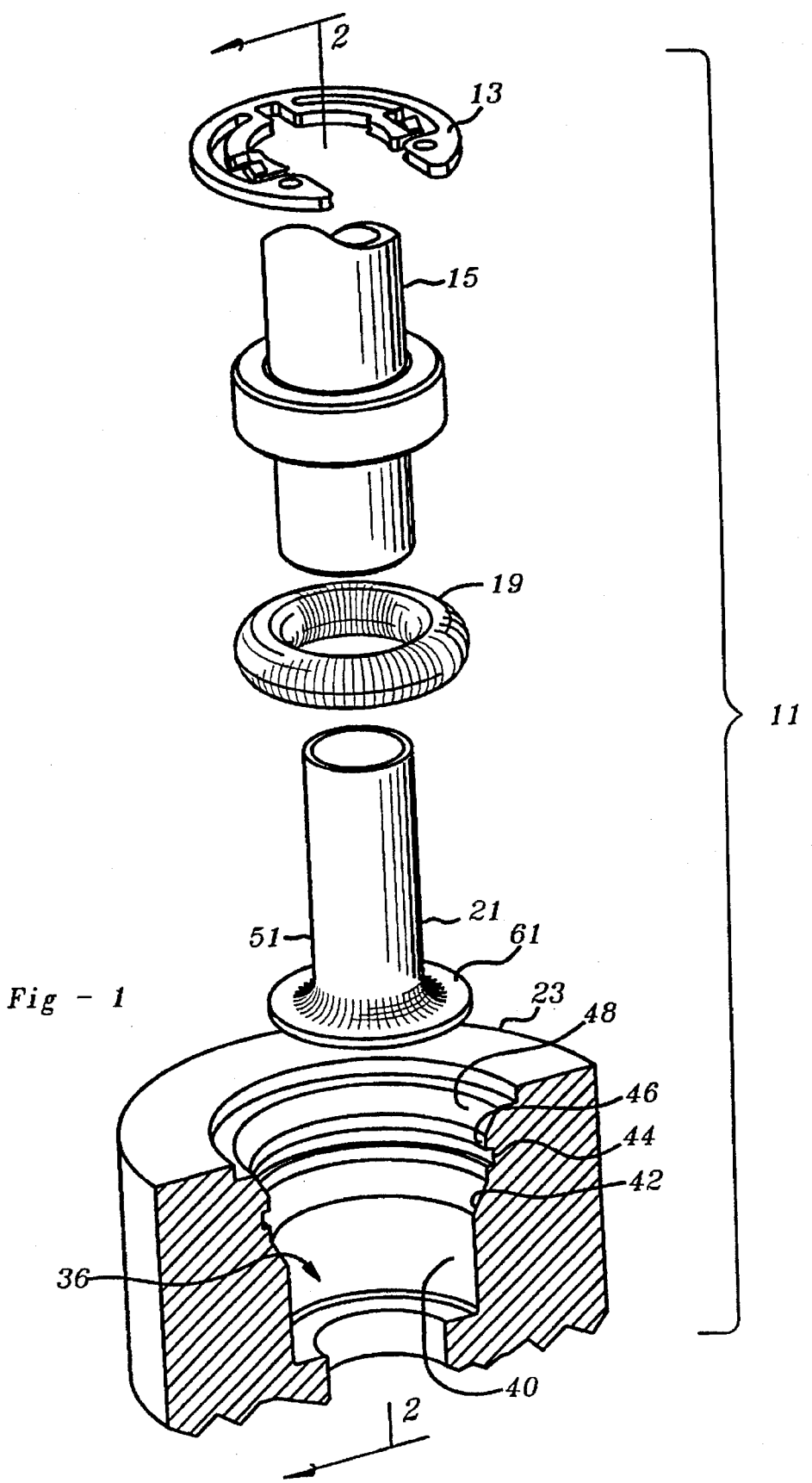
FIG. 1 is an exploded perspective view showing a first preferred embodiment of the present invention tubular assembly in relation to a mating female housing which is shown partially in section.
Figure 2:
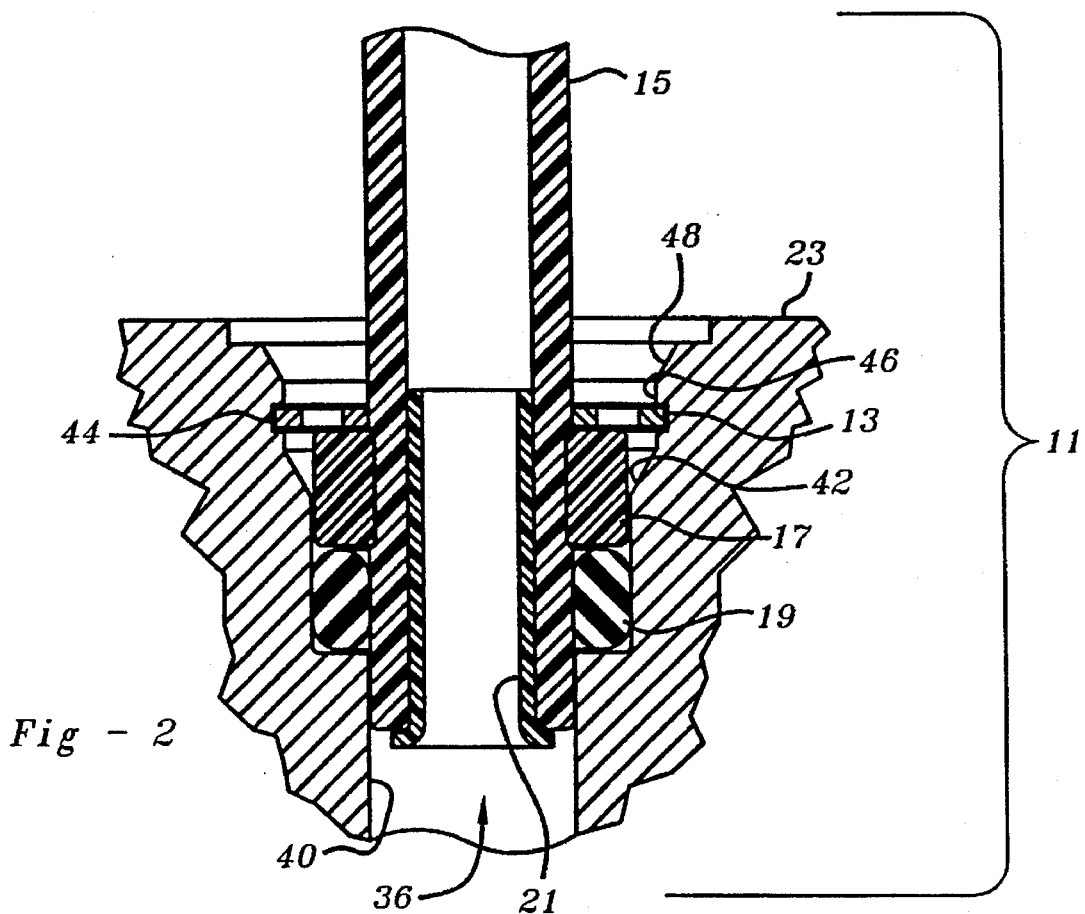
FIG. 2 is a sectional view showing the first preferred embodiment of the present invention tubular assembly in relation to the mating female housing, taken line 2—2 from FIG. 1.

Referring to FIGS. 1 and 2, a first preferred embodiment of a connector assembly 11 of the present invention is comprised of a retainer 13, a conduit or tubular member 15, a bead or bushing 17, a seal 19, a ferrule 21 and a housing 23. Connector assembly 11 acts as a fluid conduit for a fuel, braking or refrigeration system within an automotive vehicle or the like. Therefore, tubular member 15, the male part, must be securely affixed within mating housing 23, the female part.

Figure 4:
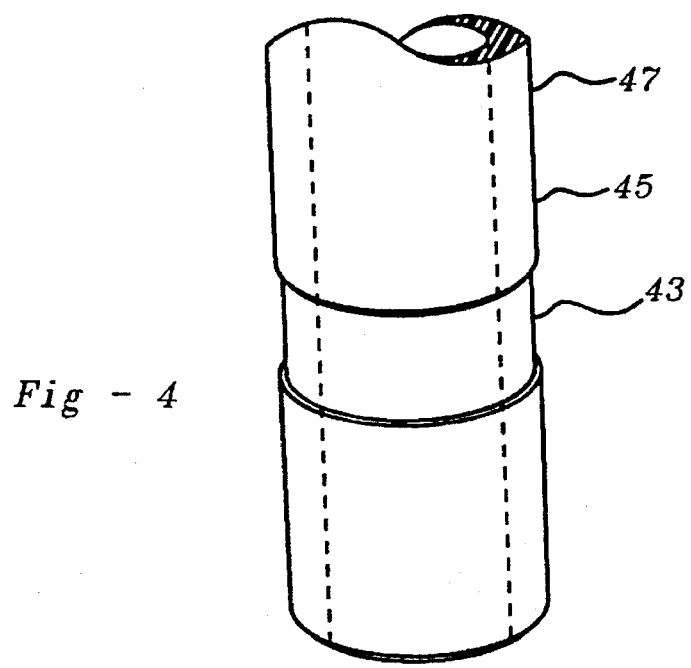
FIG. 4 is a side elevation showing a tubular member with a preformed groove therearound of a second preferred embodiment of the present invention tubular assembly, taken along line 2—2 from FIG. 1.
Figure 3:
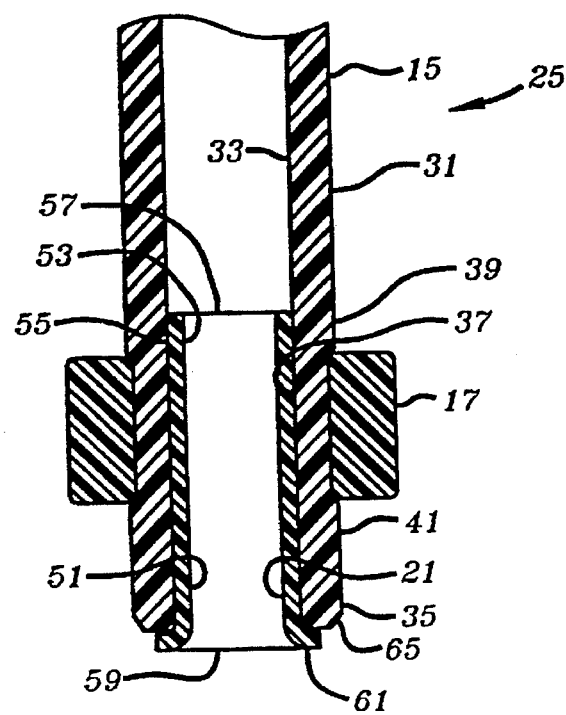
FIG. 3 is a sectional view showing the first preferred embodiment of the present invention tubular assembly, taken along line 2—2 from FIG. 1.

Referring to FIGS. 1 through 3, tubular member 15, bushing 17 and ferrule 21 define a tubular assembly 25. Tubular member 15 is an elongated cylindrically-shaped part having an outside surface 31, an inside surface 33 and a distal portion 35 at the end thereof. Outside surface 31 of tubular member 15 has a position 37 located a predetermined longitudinal distance from distal end 35 where bushing 17 is affixed. Bushing 17 is positioned at a distance far enough back from distal end 35 to accommodate "piloting" tubular member 15 into a through bore 36 which is defined by an inside surface 40 of housing 23. In the first preferred embodiment, as can best be seen in FIG. 9 an outside surface 38 of tubular member 15, located at position 37, is flush with the typical cross sectional cylindrical shape of longitudinally adjacent portions 39 and 41 prior to installation of bushing 17. Alternatively, a second preferred embodiment of the tubular member of the present invention is shown in FIG. 4. In this embodiment a circumferential groove 43 can be formed within outside surface 45 of tubular member 47. This allows for more positive positioning and frictional retention of the subsequently assembled bushing 17 (see FIG. 3). Tubular members 15 and 47 are preferably made from a semi-flexible and expandable elastomeric material such as rubber, however, expandable polymeric and metallic materials can also be used.

Returning to the first illustrative embodiment of FIGS. 1-3, provision must also be made in housing 23 for bushing 17 to be seated within a tapering bore portion 42 thereof. An exterior side end of bushing 17 engages springing retainer 13 thereby transferring the forces that would otherwise separate tubular member 15 from housing 23. Retainer 13 acts to receive these separation forces on tubular member 15 from bushing 17 and transfer the forces to female housing 23 by interlocking with the rear wall of recessed bore 44 which is provided in retainer bore 46. Moreover, a lead-in chamfer 48 aids in the installation of retainer 13. Springing retainer 13 is a quick connect fastener that is compressibly squeezed inward toward the longitudinal axis of tubular member 15 by insertion into lead-in chamfer 48 of housing 23.

Bushing 17 is annular shaped and is preferably defined by quadrilateral walls having a rectangular cross sectional shape thereto. However, as is known to one skilled in the art, such a bushing 17 may be U-shaped or have a circular cross sectional shape thereto. Bushing 17 is made from a metallic material having sufficient hoop strength to withstand the radially. outward-directed forces acting thereupon.

Ferrule 21 has a cylindrically-shaped longitudinal portion 51 with an inside surface 53 and an outside surface 55. Outside surface 55 of ferrule 21 has a larger diameter than does the typical inside surface 37 of tubular member 15. Furthermore, ferrule 21 has a leading end 57 and an opposite trailing end 59. A flange 61 is located at trailing end 59 of ferrule 21 and radially extends outward normal to said longitudinal portion 51. In this embodiment, flange 61 of ferrule 21 does not radially extend past outer surface 31 of tubular member 15. Therefore, distal end 35 of tubular member 15 may be provided with a taper 65 therearound, thus, allowing for easy centering and installation into housing 23 (see FIGS. 1 and 2).

Figure 5:
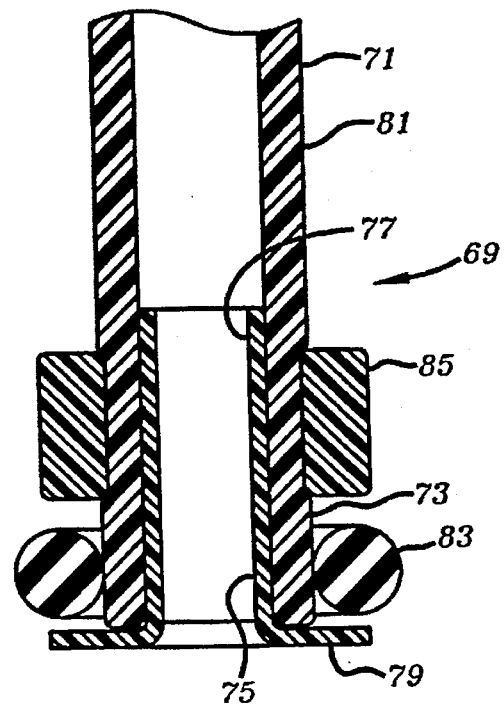
FIG. 5 is a sectional view showing a third preferred embodiment of the present invention tubular assembly, taken along line 2—2 from FIG. 1.

A third preferred embodiment of the present invention tubular assembly 69 is illustrated in FIG. 5. In this embodiment, a tubular member 71 is substantially similar to that of the first embodiment tubular member 15. However, distal end 73 of tubular member 71 does not have a tapered portion as does the first embodiment. Nevertheless, ferrule 75 has a cylindrical-shaped longitudinal portion 77 which projects inside tubular member 71 and has a flange 79 radially extending outward therefrom and normal thereto. Flange 79 extends past an outside surface 81 of tubular member 71 and serves to retain an annular-shaped seal 83 or 0-ring thereupon and to center distal end 73 within housing 23 (see FIGS. I and 2). Seal 83 is located between flange 79 and a bushing 85. Bushing 85 is substantially identical to the bushing 17 of the first preferred embodiment. Seal 83 is preferably made from an elastomeric rubber or thermoplastic resin.

Figure 6:
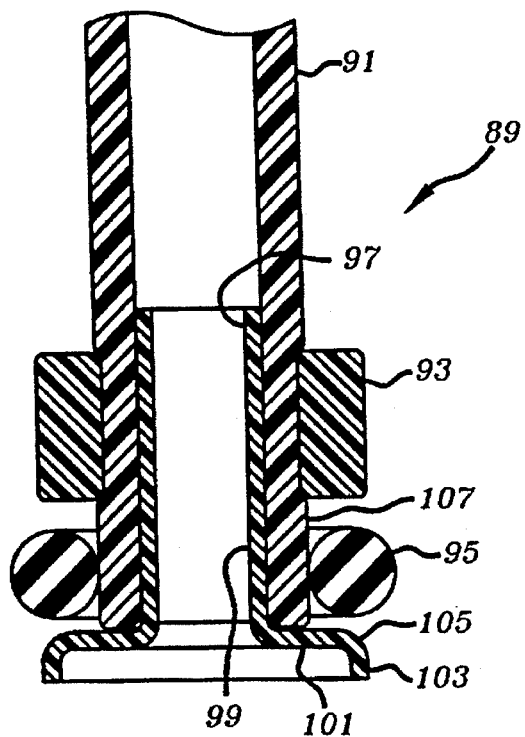
FIG. 6 is a sectional view showing a fourth preferred embodiment of the present invention tubular assembly, taken along line 2—2 from FIG. 1.

As is shown in FIG. 6, a fourth preferred embodiment of the present invention tubular assembly 89 comprises a tubular member 91, a bushing 93, a seal 95 and a ferrule 97. Tubular member 91, bushing 93 and seal 95 have the same configuration as those described for the first illustrative embodiment. However, ferrule 97 has a longitudinal cylindrically-shaped portion 99 which projects concentrically within tubular member 91 and has a flange 101 radially extending outward therefrom and normal thereto. Furthermore, a lip 103 protrudes perpendicularly outward from flange 101 around the circumference 105 thereof. Lip 103 acts to center and stabilize an untapered distal end 107 of tubular member 91 within the mating female housing 23 (see FIGS. 1 and 2). Also, as with the preceding third embodiment, flange 101 of ferrule 97 serves to retain seal 95 between itself and bushing 93.

Figure 7:
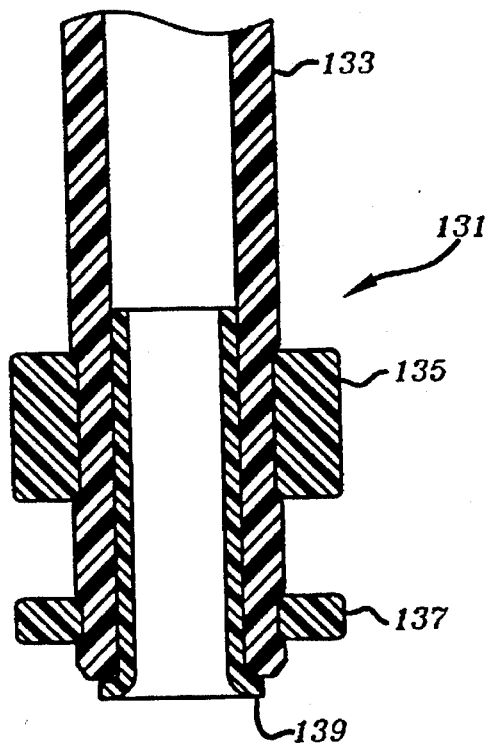
FIG. 7 is a sectional view showing a fifth preferred embodiment of the present invention tubular assembly, taken along line 2—2 from FIG. 1.
Figure 8:
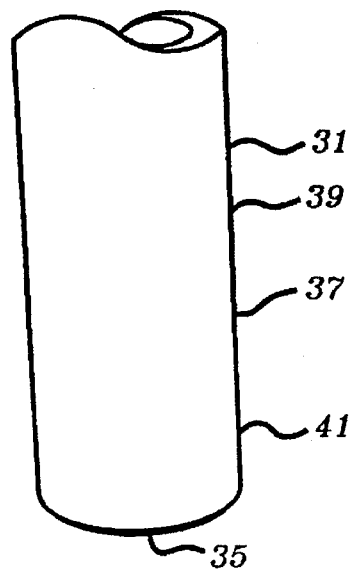
FIG. 8 is a side elevation showing the tubular member prior to the first manufacturing step for the first preferred embodiment of the present invention tubular assembly of FIGS. 1–3.

Referring to FIG. 7, a fifth preferred embodiment of the present invention tubular assembly 131 comprises a tubular member 133, a pair of bushings 135 and 137, and a ferrule 139. Seal 19 (see FIG. 1) can be retained between bushings 135 and 137 and around tubular member 133. Bushings 135 and 137 are affixed to tubular member 133 by insertion of ferrule 139 therewithin.

Figure 9:
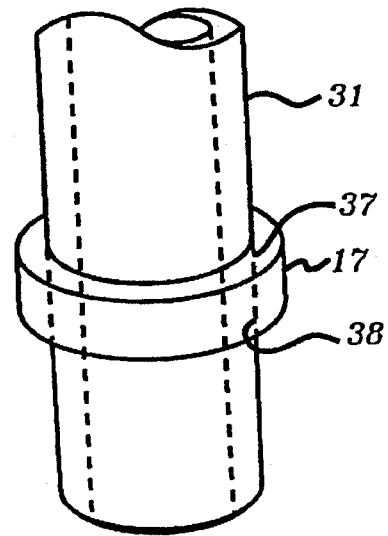
FIG. 9 is a side elevation showing the first step in the process to manufacture the present invention tubular assembly of FIGS. 1–3.
Figure 10:
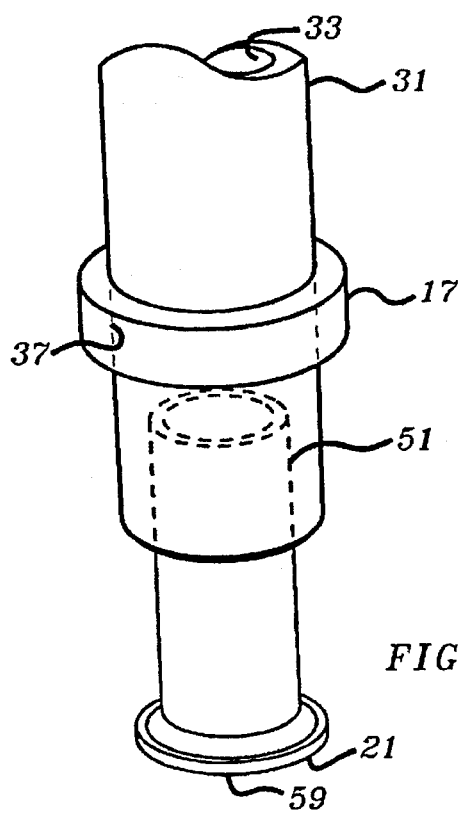
FIG. 10 is a side elevation showing the second step in the process to manufacture the present invention tubular assembly of FIGS. 1–3.
Figure 11:
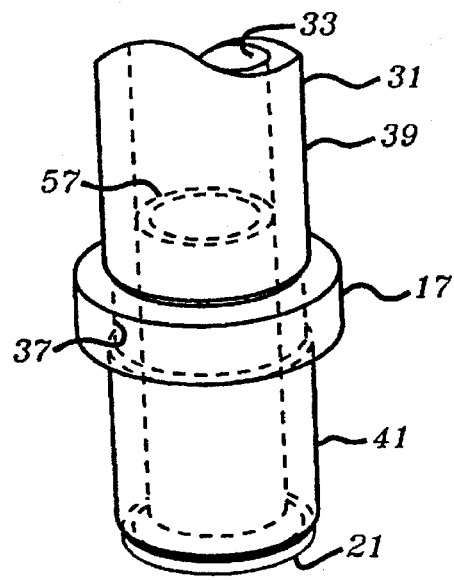
FIG. 11 is a side elevation showing the third step in the process to manufacture the present invention tubular assembly of FIGS. 1–3.
Figure 12:
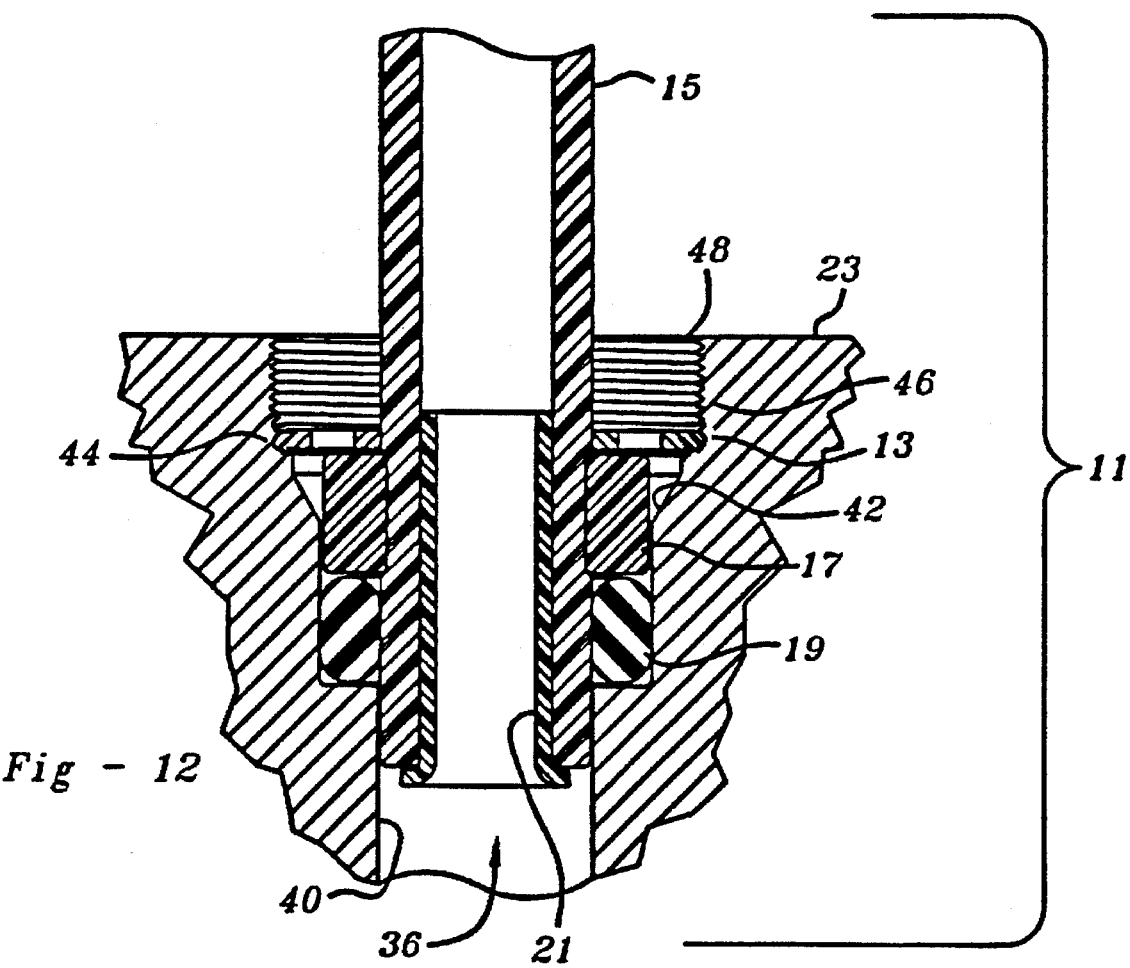
FIG. 12 is a view like FIG. 2 of an additional embodiment of the present invention.

The processing steps required to produce the present invention tubular assembly having a bead thereon are shown in FIGS. 8–11. Tubular member 31 preferably has outside surface 38 (see FIG. 9) at position 37 which is flush with the cylindrical outside surfaces 39 and 41 longitudinally adjacent thereto; this can best be seen in FIG. 8. However, as can be alternately observed in FIG. 4, predetermined position 43 may have circumferential groove 44 formed therein. The first step is illustrated in FIG. 9 wherein bushing 17 is installed around outside surface 38 of tubular member 31 at predetermined position 37. At this processing step, bushing 17 fits snugly around outside surface 38, however, bushing 17 can still be forced to move longitudinally along tubular member 31. The second processing step is shown in FIG. 10. Longitudinal portion 51 of ferrule 21 is inserted within inside surface 33 of tubular member 31. Referring to FIG. 11, in step three, leading end 57 of ferrule 21 longitudinally projects within tubular member 31 past predetermined position 37. Ferrule 21 expands inside surface 33 and outside surfaces 39 and 41 radially outward away from the longitudinal axis of tubular member 31. However, bushing 17 restricts the radial expansion of tubular member 31 at predetermined position 37. Thus, bushing 17 is firmly retained and located upon tubular member 31 thereby forming a secure bead therearound.

While a number of embodiments of this tubular assembly have been disclosed, it will be appreciated that various modifications may be made without departing from the present invention. For example, multiple seals and multiple bushings may be located longitudinally along the tubular member. Also, the ferrule does not have to contain a flange at the end thereof. Furthermore, while a specific retainer and a specific housing configuration have been shown and described, various other quick connect fasteners or threaded fittings may be used as part of a connector assembly. Moreover, such tubular assemblies may be incorporated into appliances, industrial structures and automotive vehicles. While specific materials have been disclosed in an exemplary fashion, various other materials may of course be employed. It is intended by the following claims to cover these and any other departures from the disclosed embodiments which fall within the true spirit of this invention.

The invention claimed is:

1. A tubular assembly for use in communicating a fluid media in combination with a housing having a receivable female configuration thereto, said housing further having a cylindrical inside surface which defines a central through bore extending therein, said tubular assembly comprising:

a tubular member being cylindrical in shape and having a male configuration thereof, said tubular member further having an inside surface and an outside surface with a distal end thereupon, said outside surface having a position located a predetermined longitudinal distance from said distal end thereof, said tubular member being composed of an expandable material;

means to seal between said outside surface of said tubular member and said inside surface of said housing;

a bushing being located at said predetermined position along said outside surface of said tubular member and cooperatively fitting therearound, said bushing restricting radial expansion of said tubular member; and a ferrule having a longitudinal portion thereof which is cylindrical in shape being inserted within said distal end of said tubular member, portions of said inside and outside tubular member surfaces which are longitudinally adjacent to said predetermined position being expanded radially outward by said longitudinal portion of said ferrule therewithin, said predetermined position of said tubular member being restricted from radial outward expansion by said bushing therearound, whereas said bushing is securely retained at said predetermined position upon said tubular member.

2. The tubular assembly of claim 1 wherein said ferrule has an outwardly extending flange at a trailing end thereof, said flange of said ferrule being proximate with said distal end of said tubular member after said ferrule is installed therein.

3. The tubular assembly of claim 2 wherein said flange of said ferrule extends radially outward past said outside surface of said tubular member, said flange acts to retain said sealing means thereagainst, said sealing means is located between said bushing and said flange of said ferrule and snugly surrounds said outside surface of said tubular member.

4. The tubular assembly of claim 3 wherein said flange of said ferrule has a lip portion protruding from a circumferential edge thereof and is oriented substantially normal thereto.

5. The tubular assembly of claim 2 wherein said flange of said ferrule extends radially outward past said inside surface of said tubular member and terminates prior to said outside surface thereof.

6. The tubular assembly of claim 1 wherein said means for sealing is an annular-shaped seal made from an elastomeric polymeric material.

7. The tubular assembly of claim 1 further comprising: means for retaining said tubular member to said housing.

8. The tubular assembly of claim 7 wherein said retaining means is a quick connect fastening device.

9. The tubular assembly of claim 7 wherein said retaining means is a threaded fitting.

10. The tubular assembly of claim 1 wherein said outside surface of said tubular member has a groove located circumferentially therearound, said groove is positioned at said predetermined position coincident with said bushing thereagainst, said bushing fits partially within said groove when said tubular member is radially expanded by said ferrule being inserted therewithin.

11. A method for adding a bushing around a tubular member for use in a tubular assembly which communicates a fluid media, said method comprising:

(a) installing an annular-shaped bushing around an expandable tubular member, said tubular member being cylindrically shaped and having an outside surface and an inside surface thereon, said tubular member further having a distal end extending away from said bushing;

(b) positioning said bushing on said tubular member;

(c) inserting a longitudinal portion of a ferrule into said distal end of said tubular member, said longitudinal portion of said ferrule being cylindrically shaped; and (d) expanding portions of said inside and outside surfaces of said tubular member longitudinally adjacent to said bushing, said bushing restricting radial expansion.

12. The tubular assembly of claim 11 wherein said ferrule has an outwardly extending flange at a trailing end thereof, said flange of said ferrule being proximate with said distal end of said tubular member after said ferrule is installed therein.

13. The tubular assembly of claim 12 further comprising:

a means for sealing said outside surface of said tubular member to an inside surface of a mating female housing, said sealing means being located between said bushing and said flange of said ferrule and snugly surrounding said outside surface of said tubular member; and said flange of said ferrule extending radially outward past said outside surface of said tubular member, said flange retaining said sealing means thereupon.

14. The tubular assembly of claim 13 wherein said flange of said ferrule has a lip portion protruding from a circumferential edge thereof and is oriented substantially normal thereto.

15. The tubular assembly of claim 13 wherein said means for sealing is an annular-shaped seal made from an elastomeric polymeric material.

16. The tubular assembly of claim 12 wherein said flange of said ferrule extends radially outward past said inside surface of said tubular member and terminates prior to said outside surface thereof.

17. The tubular assembly of claim 11 further comprising means for retaining said tubular member to a housing.

18. The tubular assembly of claim 17 wherein said retaining means is a quick connect fastening device.

19. The tubular assembly of claim 17 wherein said retaining means is a threaded fitting.

20. The tubular assembly of claim 11 wherein said outside surface of said tubular member has a groove located circumferentially therearound, said groove is positioned at said predetermined position coincident with said bushing thereagainst, said bushing fits partially within said groove when said tubular member is radially expanded by said ferrule being inserted therewithin.

21. A tubular assembly for use in communicating a fluid media in combination with a housing having a receivable female configuration thereto, the housing further having a cylindrical inside surface which defines a central through bore extending therein, the through bore terminating at a lead-in chamfer, the tubular assembly comprising:

a tubular member being cylindrical in shape and having a male configuration thereof, said tubular member further having an inside surface and an outside surface with a distal end thereupon, said outside surface having a position located a predetermined longitudinal distance from said distal end thereof, said tubular member being composed of an expandable material;

a springing retainer for retaining said tubular member to the housing, said retainer being compressibly squeezed upon insertion into the lead-in chamfer of the housing;

means to seal between said tubular member and said inside surface of the housing;

a bushing being located at said predetermined position along said outside surface of said tubular member and cooperatively fitting therearound, said bushing restricting radial expansion of said tubular member; and a ferrule having a longitudinal portion thereof which is cylindrical in shape being inserted within said distal end of said tubular member, portions of said inside and outside tubular member surfaces which are longitudinally adjacent to said predetermined position being expanded radially outward by said longitudinal portion of said ferrule therewithin, said predetermined position of said tubular member being restricted from radial outward expansion by said bushing therearound, whereas said bushing is securely retained at said predetermined position upon said tubular member.

* * * * *